United States Patent
Kaneko et al.

(10) Patent No.: US 12,087,334 B2
(45) Date of Patent: Sep. 10, 2024

(54) MAGNETIC RECORDING HEAD AND MANUFACTURING METHOD THEREOF, MAGNETIC RECORDING APPARATUS, AND MANUFACTURING METHOD OF MAGNETIC RECORDING MEDIUM

(71) Applicant: FUJIFILM Corporation, Tokyo (JP)

(72) Inventors: Tetsuya Kaneko, Minamiashigara (JP); Kento Nishimura, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/188,609

(22) Filed: Mar. 23, 2023

(65) Prior Publication Data

US 2023/0230614 A1 Jul. 20, 2023

Related U.S. Application Data

(63) Continuation of application No. PCT/JP2021/033107, filed on Sep. 9, 2021.

(30) Foreign Application Priority Data

Sep. 25, 2020 (JP) ................. 2020-160905

(51) Int. Cl.
*G11B 5/31* (2006.01)
*G11B 5/584* (2006.01)

(52) U.S. Cl.
CPC ............ *G11B 5/3163* (2013.01); *G11B 5/584* (2013.01)

(58) Field of Classification Search
None
See application file for complete search history.

(56) References Cited

U.S. PATENT DOCUMENTS

| | | | | |
|---|---|---|---|---|
| 4,949,207 A | * | 8/1990 | Lazzari | G11B 5/3106 |
| 5,195,006 A | * | 3/1993 | Morikawa | G11B 5/3183 |
| | | | | 360/125.35 |
| 5,224,260 A | * | 7/1993 | Fedeli | G11B 5/3106 |
| 5,274,520 A | * | 12/1993 | Matsuzono | G11B 5/3967 |

(Continued)

FOREIGN PATENT DOCUMENTS

| | | |
|---|---|---|
| JP | 06-333210 A | 12/1994 |
| JP | 09-326113 A | 12/1997 |

(Continued)

OTHER PUBLICATIONS

Office Action issued Aug. 8, 2023 in Japanese Application No. 2020-160905.

(Continued)

*Primary Examiner* — William J Klimowicz
(74) *Attorney, Agent, or Firm* — Sughrue Mion, PLLC

(57) ABSTRACT

Provided are a magnetic recording heading having a magnetic film including a write gap, in which in the write gap, a recording surface-side gap width is narrower than a back surface-side gap width, and the write gap has an opening portion formed by ion beam processing at a gap end portion on a recording surface side, a magnetic recording apparatus including the magnetic recording head, a manufacturing method of the magnetic recording head, and a manufacturing method of a magnetic recording medium having a servo pattern, including forming a servo pattern on the magnetic recording medium by the magnetic recording head.

16 Claims, 9 Drawing Sheets

(56) References Cited

U.S. PATENT DOCUMENTS

| | | | | |
|---|---|---|---|---|
| 5,572,392 A | * | 11/1996 | Aboaf | G11B 5/488 |
| 5,689,384 A | * | 11/1997 | Albrecht | G11B 5/584 |
| 5,793,577 A | * | 8/1998 | Katz | G11B 5/3133 |
| | | | | 360/125.34 |
| 6,212,034 B1 | * | 4/2001 | Fedeli | G11B 5/3183 |
| | | | | 360/125.34 |
| 6,269,533 B2 | | 8/2001 | Dugas | |
| 6,879,457 B2 | * | 4/2005 | Eaton | G11B 5/584 |
| 7,119,976 B2 | * | 10/2006 | Biskeborn | B82Y 10/00 |
| | | | | 360/75 |
| 7,190,551 B2 | * | 3/2007 | Suda | G11B 5/024 |
| 7,199,957 B2 | * | 4/2007 | Rothermel | G11B 5/584 |
| 7,800,862 B1 | * | 9/2010 | Dugas | G11B 5/3116 |
| | | | | 360/119.06 |
| 8,014,100 B2 | * | 9/2011 | Biskeborn | G11B 5/00826 |
| | | | | 360/125.35 |
| 11,862,212 B2 | * | 1/2024 | Tachibana | G11B 5/706 |
| 2001/0019464 A1 | * | 9/2001 | Poorman | G11B 5/584 |
| 2003/0151844 A1 | * | 8/2003 | Eaton | G11B 5/584 |
| 2005/0052783 A1 | * | 3/2005 | Suda | G11B 5/584 |
| 2007/0116989 A1 | | 5/2007 | Ikekame et al. | |
| 2008/0273264 A1 | * | 11/2008 | Biskeborn | G11B 5/584 |
| 2010/0321824 A1 | * | 12/2010 | Dugas | G11B 5/265 |
| | | | | 360/119.06 |
| 2012/0314318 A1 | | 12/2012 | Olson et al. | |
| 2013/0100552 A1 | * | 4/2013 | Kabelac | G11B 5/584 |
| 2014/0268414 A1 | * | 9/2014 | Nakashio | G11B 5/78 |
| | | | | 360/110 |

FOREIGN PATENT DOCUMENTS

| | | | |
|---|---|---|---|
| JP | 2001-256614 A | 9/2001 | |
| JP | 2005-222570 A | 8/2005 | |
| JP | 2006-260745 A | 9/2006 | |
| JP | 2007-149155 A | 6/2007 | |
| JP | 2020-013630 A | 1/2020 | |
| JP | 2020-024776 A | 2/2020 | |

OTHER PUBLICATIONS

International Search Report issued Nov. 22, 2021 in International Application No. PCT/JP2021/033107.

Written Opinion issued Nov. 22, 2021 in International Application No. PCT/JP2021/033107.

International Preliminary Report on Patentability dated Mar. 28, 2023 with a Translation of the Written Opinion of the International Searching Authority in Application No. PCT/JP2021/033107.

* cited by examiner

MAGNETIC RECORDING HEAD AND MANUFACTURING METHOD THEREOF, MAGNETIC RECORDING APPARATUS, AND MANUFACTURING METHOD OF MAGNETIC RECORDING MEDIUM

CROSS-REFERENCE TO RELATED APPLICATIONS

This application is a Continuation of PCT International Application No. PCT/JP2021/033107 filed on Sep. 9, 2021, which claims priority under 35 U.S.C. § 119(a) to Japanese Patent Application No. 2020-160905 filed on Sep. 25, 2020. Each of the above applications is hereby expressly incorporated by reference, in its entirety, into the present application.

BACKGROUND OF THE INVENTION

1. Field of the Invention

The present invention relates to a magnetic recording head and a manufacturing method thereof, a magnetic recording apparatus, and a manufacturing method of a magnetic recording medium.

2. Description of the Related Art

Information can be magnetically recorded on a magnetic recording medium by forming a magnetization region on a magnetic layer of the magnetic recording medium by a magnetic recording head. Servo signals can be exemplified as an example of such information. The magnetization region formed to obtain servo signals is referred to as a servo pattern. U.S. Pat. No. 6,269,533B discloses a magnetic recording head used for forming a servo pattern.

SUMMARY OF THE INVENTION

U.S. Pat. No. 6,269,533B discloses that a gap having a shape corresponding to a shape of a servo pattern to be formed on a magnetic recording medium is formed by focused ion beam (claim 1 and the like in U.S. Pat. No. 6,269,533B). In the third column, lines 62 to 67 of U.S. Pat. No. 6,269,533B, it is described that an extremely precise gap can be formed by focused ion beam.

Therefore, the inventors have studied the gap formation by ion beam processing in the manufacturing process of a magnetic recording head. In such studies, the inventors have thought that it is desirable to increase the recording ability of a magnetic recording head having a gap formed by ion beam processing. This is due to the following reasons. A magnetic recording medium having high coercivity has excellent thermal stability, and thus has an excellent recorded information-retaining property. However, it is difficult to record the information on the magnetic recording medium. Therefore, a magnetic recording head having high recording ability is required for recording on a magnetic recording medium having high coercivity. Therefore, in order to perform good recording even on a magnetic recording medium having high coercivity, it is desirable that the magnetic recording head has high recording ability.

An object of an aspect of the present invention is to provide a magnetic recording head having a gap formed by ion beam processing and capable of exhibiting high recording ability.

An aspect of the present invention relates to a magnetic recording head having a magnetic film including a write gap,
in which in the write gap, a recording surface-side gap width is narrower than a back surface-side gap width, and
the write gap has an opening portion formed by ion beam processing at a gap end portion on a recording surface side.

In an embodiment, the magnetic recording head may be a servo write head.

In an embodiment, the recording surface-side gap width of the write gap may be 0.2 µm or more and 1.5 µm or less.

In an embodiment, the back surface-side gap width of the write gap may be 2.0 µm or more and 20.0 µm or less.

In an embodiment, a thickness of the magnetic film may be 1.0 µm or more and 10.0 µm or less.

In an embodiment, the write gap may include a non-magnetic material portion at a gap end portion on a back surface side.

In an embodiment, a thickness of the non-magnetic material portion may be 5% or more and 90% or less with respect to a thickness of the magnetic film.

In an embodiment, a non-magnetic material constituting the non-magnetic material portion may be a silicon oxide.

In an embodiment, the magnetic film may be an iron nitride-based alloy film.

In an embodiment, the ion beam processing may be focused ion beam processing.

An aspect of the present invention relates to a magnetic recording apparatus including the magnetic recording head.

In an embodiment, the magnetic recording apparatus may be a servo writer.

An aspect of the present invention relates to
a manufacturing method of the magnetic recording head, including
forming a non-magnetic material portion on a substrate,
forming a magnetic film to cover the non-magnetic material portion on the substrate, and
forming an opening portion by ion beam processing in a portion of the magnetic film in which a write gap is required to be formed,
in which the portion to be subjected to ion beam processing has the non-magnetic material portion between the magnetic film and the substrate.

In an embodiment, the ion beam processing may be focused ion beam processing.

An aspect of the present invention relates to a manufacturing method of a magnetic recording medium having a servo pattern, including forming a servo pattern on the magnetic recording medium by the magnetic recording head.

In an embodiment, the servo pattern may be a timing-based servo pattern.

In an embodiment, vertical coercivity of the magnetic recording medium may be 2,800 Oe or more.

According to an aspect of the present invention, it is possible to provide a magnetic recording head having a gap formed by ion beam processing and capable of exhibiting high recording ability, a magnetic recording apparatus including the magnetic recording head, and a manufacturing method of the magnetic recording head. In addition, according to an aspect of the present invention, it is possible to provide a manufacturing method of a magnetic recording medium, including forming a servo pattern on the magnetic recording medium by the magnetic recording head.

DESCRIPTION OF THE PREFERRED EMBODIMENTS

Magnetic Recording Head

Figure 1:
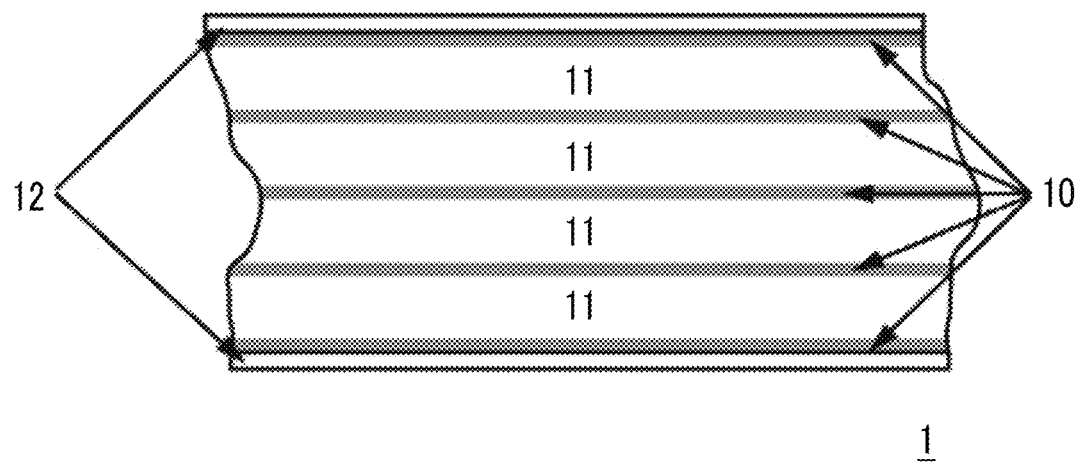
FIG. 1 shows an example of the arrangement of data bands and servo bands in a magnetic tape.

An aspect of the present invention relates to a magnetic recording head having a magnetic film including write gaps, in which in the write gap, a recording surface-side gap width is narrower than a back surface-side gap width, and the write gap has an opening portion formed by ion beam processing at a gap end portion on the recording surface side.

In the present invention and the present specification, the "write gap" included in the magnetic film of the magnetic recording head is a magnetic spacing which is a spacing generating a leakage magnetic field for recording. The width of such a magnetic spacing is the gap width. The magnetic spacing includes a physical spacing, i.e., an opening, and a portion that is not physically separated but is magnetically separated by the presence of a non-magnetic material. As will be described below in detail, the magnetic recording head includes a write gap having an opening formed by ion beam processing at a gap end portion on the recording surface side.

In the present invention and the present specification, the "recording surface side" refers to a magnetic recording head surface side that faces a surface of a magnetic layer of a magnetic recording medium to be recorded in a contact state or a non-contact state during recording, and the surface side opposite to the above surface is referred to as the "back surface side". The "surface of the magnetic layer" has the same meaning as the surface of the magnetic recording medium on the magnetic layer side.

In the present invention and the present specification, the "recording surface-side gap width" refers to a gap width at an end portion of the write gap on the recording surface side, and the "back surface-side gap width" refers to a gap width at an end portion of the write gap on the back surface side. The magnetic recording head is usually provided with a plurality of write gaps. In the magnetic recording head, at least one write gap is a write gap in which a recording surface-side gap width is narrower than a back surface-side gap width, and an opening portion formed by ion beam processing is provided at a gap end portion on the recording surface side. It is preferable that all the write gaps are write gaps in which a recording surface-side gap width is narrower than a back surface-side gap width, and an opening portion formed by ion beam processing is provided at a gap end portion on the recording surface side. In the following description, the "write gap in which a recording surface-side gap width is narrower than a back surface-side gap width, and an opening portion formed by ion beam processing is provided at a gap end portion on the recording surface side" is referred to as the "recording surface-side narrow-width write gap". In the present invention and the present specification, the "gap end portion on the recording surface side" refers to a portion on the end portion side including an end portion of the write gap on the recording surface side. The "gap end portion on the back surface side" refers to a portion on the end portion side including the end portion of the write gap on the back surface side. Based on the measurement results of the following measurement, it is determined whether the recording surface-side gap width is narrower than the back surface-side gap width in each write gap. The gap width is measured at three places on each of the recording surface side and the back surface side. Details of the measurement of the gap width will be described later. On the recording surface side and the back surface side, arithmetic averages of the measured values are determined as the recording surface-side gap width and the back surface-side gap width of the write gap, respectively.

In addition, the "recording surface-side gap width of the write gap" in the magnetic recording head to be measured is obtained as an arithmetic average of the values obtained by subjecting all the recording surface-side narrow-width write gaps to the measurement of the recording surface-side gap width at three places in one write gap. The "back surface-side gap width of the write gap" in the magnetic recording head to be measured is obtained as an arithmetic average of the values obtained by subjecting all the recording surface-side narrow-width write gaps to the measurement of the back surface-side gap width at three places in one write gap.

The places at which the gap width is measured in each write gap are three places, i.e., a place in the vicinity of a central portion of the write gap, a place in the vicinity of one end portion (for example, a place about 10 μm away from the end portion), and a place in the vicinity of the other end portion (for example, a place about 10 μm away from the end portion). The gap width can be measured by a known measuring device having a length measuring function, such as a laser microscope, a scanning electron microscope (SEM), or the like. The measurement is performed by non-destructive inspection or destructive inspection. For example, the recording surface-side gap width can be non-destructively measured by observing the magnetic recording head in plan view from the recording surface side. However, the recording surface-side gap width can also be measured by performing destructive inspection. Usually, the back surface-side gap width can be measured by performing destructive inspection. For example, a cross-sectional sample of a portion including a write gap is produced at a place at which the gap width is measured, and a back surface-side gap width can be measured in this cross-sectional sample. For example, by exposing a cross-section in a direction to be described below, it is possible to produce a cross-sectional sample in which the gap width can be measured. The cross-sectional sample can be produced by a known method. Examples of the method of producing a cross-sectional sample include a method of mechanically forming a cross-section by using a microtome or the like, ion beam processing such as FIB processing, and a method of forming a cross-section by applying energy such as laser processing. It is preferable to produce a cross-sectional sample by ion beam processing such as FIB processing in consideration of the hardness of a material that can be usually used as a material of the magnetic recording head. Furthermore, regarding a portion that is not physically separated but is magnetically separated by the presence of a non-magnetic material, whether the portion is made of a non-magnetic material or a magnetic material can be specified by a known method, for example, an elemental analysis and/or composition analysis method such as energy dispersive X-ray spectroscopy or Auger electron spectroscopy.

Hereinafter, a form of a magnetic recording head for forming a servo pattern, that is an example of a magnetization region formed on a magnetic layer of a magnetic recording medium (specifically, a magnetic tape) by the magnetic recording head, will be described.

In recent years, a timing-based servo system has been widely used as a system performing head tracking using a servo signal (hereinafter, referred to as "servo system"). In the timing-based servo system (hereinafter, referred to as "timing-based servo system"), a plurality of servo patterns of two or more different shapes are formed on a magnetic layer, and a position of a servo signal reading element is recognized by a time interval during which the servo signal reading element reproduces (reads) two servo patterns of different shapes and a time interval during which the servo signal reading element reproduces two servo patterns of the same shape. In the present invention and the present specification, the "timing-based servo pattern" refers to a servo pattern capable of allowing head tracking in the timing-based servo system. The servo pattern capable of allowing head tracking in the timing-based servo system is formed as a plurality of servo patterns of two or more different shapes on a magnetic layer by a servo write head that is a head for forming a servo pattern. In one example, a plurality of servo patterns of two or more different shapes are continuously arranged at regular intervals for each of a plurality of servo patterns of the same shape. In another example, different kinds of servo patterns are arranged alternately. Regarding the fact that the servo patterns have the same shape, a difference in shape that can normally occur in the formation of the servo pattern does not matter. The shapes of the servo patterns capable of allowing head tracking in the timing-based servo system and the arrangement of the servo patterns on the servo band are known, and specific forms thereof will be described later.

Figure 2:
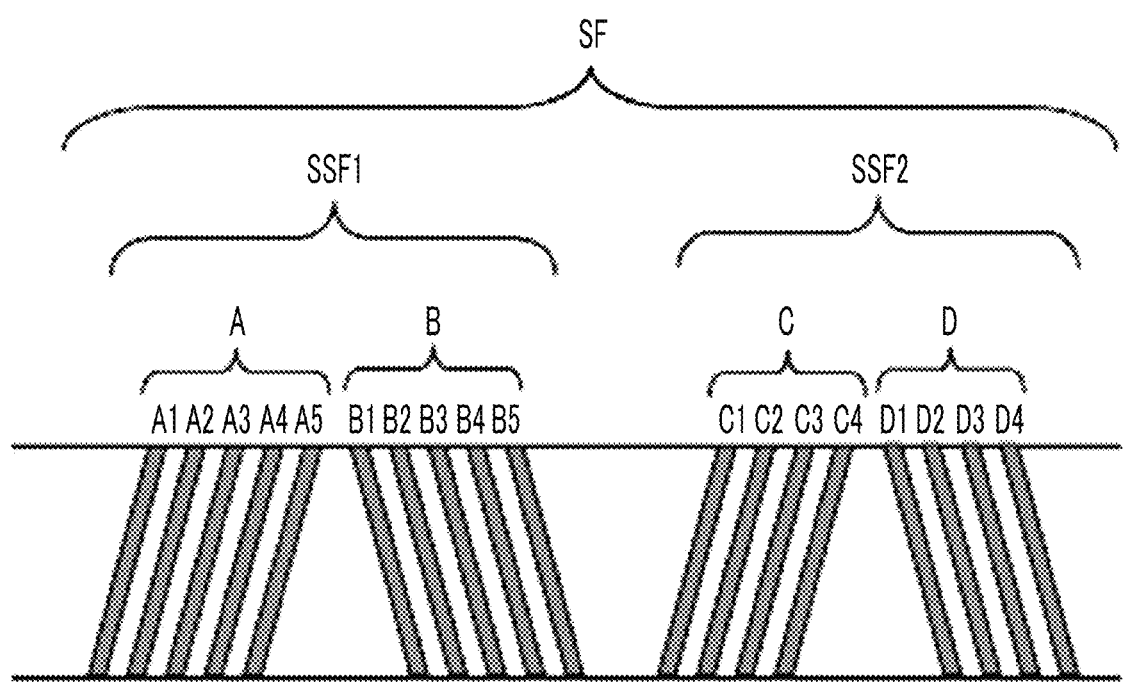
FIG. 2 shows an example of the arrangement of servo patterns of a Linear Tape-Open (LTO) Ultrium format tape.

For example, in a linear recording system that is widely used at present, a timing-based servo system is generally employed. Usually, in a magnetic tape applied to the system, a plurality of regions (referred to as "servo bands") in which a servo pattern is formed exist on a magnetic layer along a longitudinal direction of the magnetic tape. The region interposed between two servo bands is referred to as a data band. Data (magnetic signal) recording is performed on the data band, and a plurality of data tracks are formed along the longitudinal direction in each data band. FIG. 1 shows an example of the arrangement of data bands and servo bands. In FIG. 1, a plurality of servo bands 10 are arranged on a magnetic layer of a magnetic tape 1 so as to be interposed between guard bands 12. A plurality of regions 11 interposed between two servo bands are data bands. A servo pattern is a magnetization region, and is formed by magnetizing a specific region of the magnetic layer by a servo write head. The region magnetized by the servo write head (position where the servo pattern is formed) is defined according to the standard. For example, in an industry standard Linear Tape-Open (LTO) Ultrium format tape, a plurality of servo patterns inclined with respect to the tape width direction as shown in FIG. 2 are formed on the servo band during manufacturing of the magnetic tape. Specifically, in FIG. 2, a servo frame SF on the servo band 10 is composed of a servo subframe 1 (SSF1) and a servo subframe 2 (SSF2). The servo subframe 1 is composed of an A-burst (in FIG. 2, reference numeral A) and a B-burst (in FIG. 2, reference numeral B). The A-burst is composed of servo patterns A1 to A5, and the B-burst is composed of servo patterns B1 to B5. The servo subframe 2 is composed of a C-burst (in FIG. 2, reference numeral C) and a D-burst (in FIG. 2, reference numeral D). The C-burst is composed of servo patterns C1 to C4, and the D-burst is composed of servo patterns D1 to D4. Such 18 servo patterns are arranged in sets of 5 and sets of 4 in the servo subframes arranged in an arrangement of 5, 5, 4, 4, and used to identify the servo frame. FIG. 2 shows one servo frame. However, in each servo band, a plurality of servo frames are arranged in the traveling direction. In FIG. 2, the arrow indicates the traveling direction of the magnetic tape. The traveling direction side of the arrow is the upstream side, and the opposite side is the downstream side.

Figure 3:
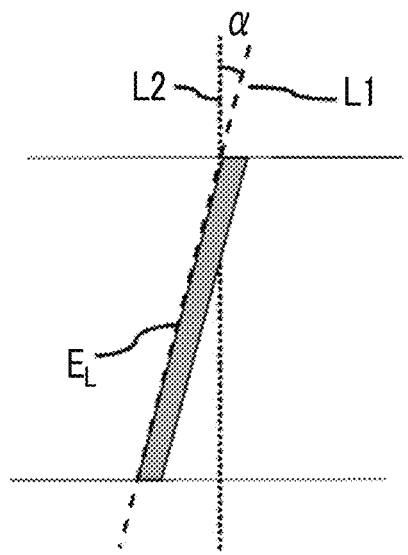
FIG. 3 is a diagram explaining an azimuth angle α.
Figure 4:
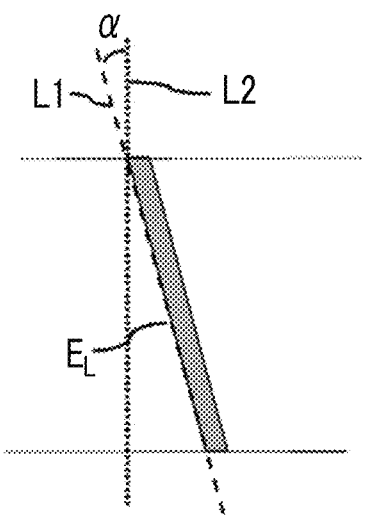
FIG. 4 is a diagram explaining an azimuth angle α.

FIGS. 3 and 4 are diagrams explaining an azimuth angle α. In the servo patterns shown in FIG. 2, regarding the servo patterns inclined toward the upstream side in the traveling direction, such as the servo patterns A1 to A5 and C1 to C4, the angle formed by the line segment (broken line L1 in FIG. 3) connecting two end portions of an edge $E_L$ on the downstream side and the tape width direction (broken line L2 in FIG. 3) is the azimuth angle α. Regarding the servo patterns inclined toward the downstream side in the traveling direction, such as the servo patterns B1 to B5 and D1 to D4, the angle formed by the line segment (broken line L1 in FIG. 4) connecting two end portions of an edge $E_L$ on the downstream side and the tape width direction (broken line L2 in FIG. 4) is the azimuth angle α.

Figure 5:
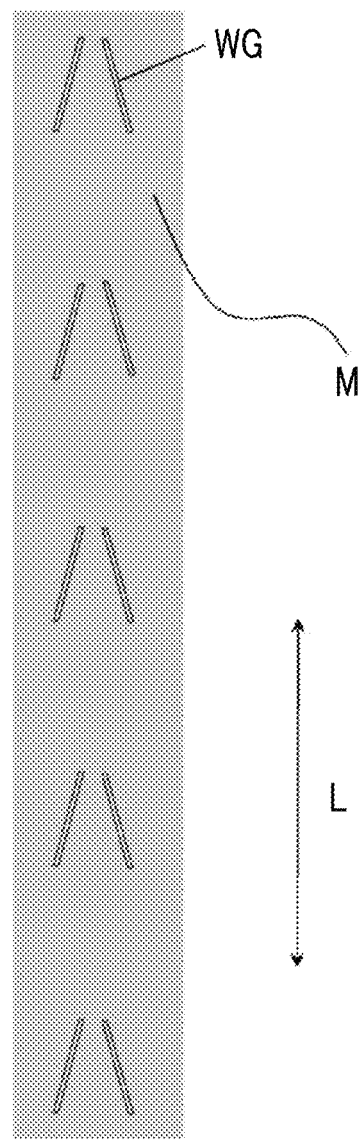
FIG. 5 shows an example of the arrangement of write gaps in a magnetic recording head.

A magnetic recording head that forms a servo pattern on a magnetic layer of a magnetic recording medium is a servo write head. FIG. 5 shows an example of the arrangement of write gaps in a magnetic recording head (servo write head) for forming the servo patterns as described above. FIG. 5 is a schematic plan view of a magnetic film observed from the recording surface side of the magnetic recording head, and five pairs of write gaps "Λ" are provided in a longitudinal direction L. Therefore, a magnetic film M of the magnetic recording head are provided with a total of 10 write gaps WG (white blank portions in the drawing). Each write gap is inclined with respect to the longitudinal direction at the same azimuth angle α as the servo patterns to be formed on the magnetic layer of the magnetic recording medium. During recording, a pulse current is applied to the magnetic recording head that faces a surface of a magnetic layer of a magnetic recording medium to be recorded in a contact state or a non-contact state, so that a leakage magnetic field is generated between the write gaps at a position where a predetermined servo pattern is required to be formed. Thus, it is possible to form and arrange servo patterns on each of five servo bands as shown in FIG. 2. For example, by applying a pulse current, a pair of servo patterns (servo pattern A1 and servo pattern B1) can be formed by a pair of write gaps "Λ", and servo patterns A2 and B2, servo patterns A3 and B3, servo patterns A4 and B4, servo patterns A5 and B5, servo patterns C1 and D1, servo patterns C2 and D2, servo patterns C3 and D3, and servo patterns C4 and D4 can be sequentially formed. In this manner, by repeating the formation of servo pattern pairs, a plurality of servo frames SF can be sequentially formed in the longitudinal direction of the servo band of the magnetic layer of the magnetic recording medium.

Figure 6A:
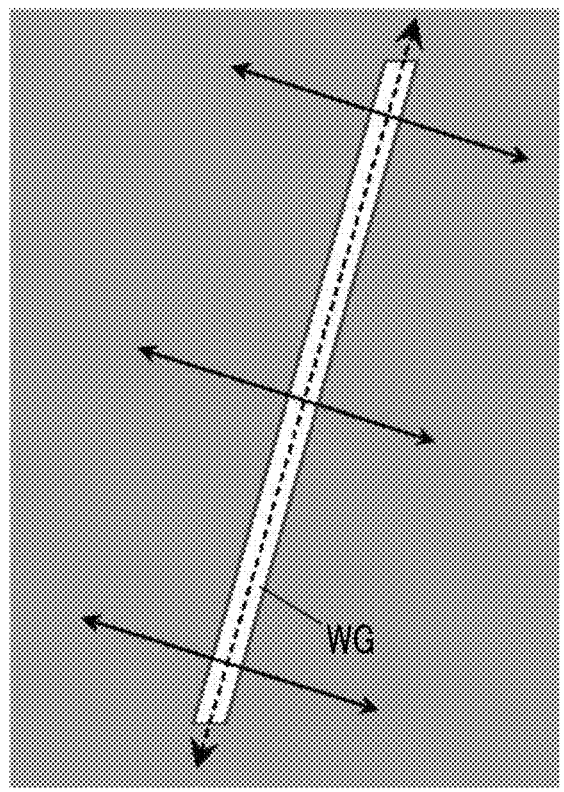
FIG. 6A is a diagram explaining a position where a gap width is measured.
Figure 6B:
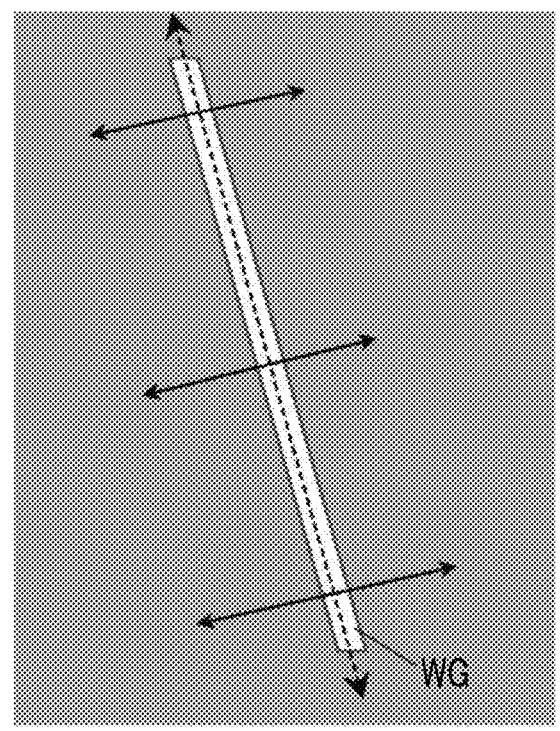
FIG. 6B is a diagram explaining a position where a gap width is measured.

FIGS. 6A and 6B are diagrams explaining a position where the gap width is measured. A measurement direction of the gap width of the write gap inclined at the azimuth angle α is a direction orthogonal to the azimuth angle direction. In FIGS. 6A and 6B, the dotted arrow indicates the azimuth angle direction, and the solid arrow indicates the measurement direction of the gap width. As described above, in one write gap, three places are provided as a place at which the recording surface-side gap width is measured. As described above, in one write gap, three places are also provided as a place at which the back surface-side gap width is measured. FIG. 6A shows a write gap for forming a servo pattern of the A-burst and the C-burst. FIG. 6B shows a write gap for forming a servo pattern of the B-burst and the D-burst.

In the above description, the magnetic recording head (servo write head) for forming a servo pattern on a magnetic layer of a magnetic recording medium applicable to a timing-based servo system has been described as an example. However, the magnetic recording head is not limited to those for forming a timing-based servo pattern, and may be, for example, a magnetic recording head for forming a servo pattern allowing head tracking in an amplitude-based servo system. The known technologies including, for example, the technologies described in U.S. Pat. Nos. 5,689,384A, 6,542,325B, and 7,876,521B can be referred to for details of the head tracking in the timing-based servo system. In addition, the known technologies including, for example, U.S. Pat. Nos. 5,426,543A and 5,898,533A can be referred to for details of the head tracking in the amplitude-based servo system. In addition, in one embodiment, the magnetic recording head can also be used as a magnetic recording head for data recording. For example, the magnetic recording head can also be used as a magnetic recording head for recording various types of information (data) on a magnetic layer of a magnetic recording medium on which servo patterns have been already formed.

In the present invention and the present specification, the "ion beam processing" refers to a process of forming an opening portion by ion beam irradiation. The opening portion formed as above includes a form of a through hole extending from the surface of the magnetic film on the recording surface side to the surface on the back surface side, and a form in which an opening is formed at a portion on the surface side of the magnetic film on the recording surface side and does not extend to the surface on the back surface side. Regarding the specification that the opening portion is an "opening portion formed by ion beam processing", the opening portion formed by ion beam processing performed by irradiating the magnetic film with ion beams is a portion that is physically opened, that is, a portion in which neither the magnetic material nor the non-magnetic material exists, and is characterized in that the opening width narrows toward the thickness direction from the surface of the magnetic film on the recording surface side. In addition, usually, a portion (so-called burnt-out site) altered by ion irradiation in the vicinity of the opening portion can be confirmed in the surface of the magnetic film on the recording surface side. This is because, a processing target region for ion beam processing is usually designated by a scanning ion microscope (SIM) image.

As described above, the opening portion formed in the magnetic film by ion beam processing is characterized in that the opening width narrows toward the thickness direction from the surface of the magnetic film on the recording surface side. Therefore, in the write gap produced simply by performing ion beam processing on the magnetic film, the recording surface-side gap width is wider than the back surface-side gap width. On the recording surface side with a wide gap width, the magnetic resistance increases, and thus it becomes difficult to focus the magnetic flux. It is thought that this causes a decrease in recording ability of the magnetic recording head.

Regarding this, the inventors have conducted intensive studies, and newly found that, for example, by employing a manufacturing method described below, it is possible to provide a magnetic recording head in which an opening portion formed by ion beam processing is provided at a gap end portion on the recording surface side, and a recording surface-side gap width is narrower than a back surface-side gap width. In such a magnetic recording head, it is thought that the magnetic field generated on the back surface side is likely to have a high intensity and the magnetic flux is likely to be relatively focused on the recording surface side. This is presumed to contribute to the improvement of the recording ability. However, the present invention is not limited to the inferences described in the present specification.

In the present invention and the present specification, "magnetic" means a ferromagnetic property, and "non-magnetic" means not ferromagnetic. As a magnetic property, a soft magnetic property is preferable, and regarding a non-magnetic property, it is preferable that the relative magnetic permeability is sufficiently close to 1.0 as compared to a general high magnetic permeability material.

Hereinafter, the magnetic recording head will be described in greater detail.

Recording Surface-Side Gap Width and Back Surface-Side Gap Width

In the magnetic recording head, at least one write gap, preferably all the write gaps, are recording surface-side narrow-width write gaps in which the recording surface-side gap width is narrower than the back surface-side gap width.

The recording surface-side gap width of the write gap, calculated as an arithmetic average of the values measured in all the recording surface-side narrow-width write gaps included in the magnetic recording head as described above, may be, for example, 0.1 μm or more, and is preferably 0.2 μm or more, and more preferably 0.5 μm or more from the viewpoint of further improvement in recording ability. In addition, the recording surface-side gap width of the write gap may be, for example, 2.0 μm or less, and is preferably 1.5 μm or less, and more preferably 1.3 μm or less from the viewpoint of further improvement in recording ability. In addition, in each recording surface-side narrow-width write gap included in the magnetic recording head, the recording surface-side gap width obtained as an arithmetic average of the values measured at three places as described above may also be within the above-described range, and is preferably within the above-described range.

In the magnetic recording head, the back surface-side gap width of the write gap, calculated as an arithmetic average of the values measured in all the recording surface-side narrow-width write gaps included in the magnetic recording head as described above, may be, for example, 1.0 μm or more, and is preferably 2.0 μm or more, and more preferably 5.0 μm or more from the viewpoint of further improvement in recording ability. In addition, the back surface-side gap width of the write gap may be, for example, 25.0 μm or less, and is preferably 20.0 μm or less, and more preferably 15.0 μm or less from the viewpoint of further improvement in recording ability. In addition, in each recording surface-side narrow-width write gap included in the magnetic recording head, the back surface-side gap width obtained as an arithmetic average of the values measured at three places as described above may also be within the above-described range, and is preferably within the above-described range.

In addition, a ratio of the back surface-side gap width of the write gap calculated as an arithmetic average of the values measured in all the recording surface-side narrow-width write gaps as described above to the recording surface-side gap width of the write gap calculated as an arithmetic average of the values measured in all the recording surface-side narrow-width write gaps (back surface-side gap width/recording surface-side gap width) may be more than 1.0, and is preferably 1.5 or more, more preferably 2.0 or more, and even more preferably 5.0 or more. In addition, the ratio may be, for example, 60.0 or less, and is preferably 50.0 or less, more preferably 40.0 or less, even more preferably 30.0 or less, and further preferably 20.0 or less. In addition, in each recording surface-side narrow-width write gap included in the magnetic recording head, a ratio of the back surface-side gap width obtained as an arithmetic average of the values measured at three places as described above to the recording surface-side gap width (back surface-side gap width/recording surface-side gap width) may also be within the above-described range, and is preferably within the above-described range.

Gap End Portion on Recording Surface Side

In the magnetic recording head, at least one write gap, preferably all the write gaps, are recording surface-side narrow-width write gaps in which an opening portion formed by ion beam processing is provided at a gap end portion on the recording surface side. According to the ion beam processing, for example, delicate gaps can be formed as described in U.S. Pat. No. 6,269,533B. However, in a case where the ion beam processing is simply performed, it is thought that the recording surface-side gap width is wider than the back surface-side gap width as described above, and the recording ability is thus reduced. Regarding this, the magnetic recording head includes a write gap in which the recording surface-side gap width of the write gap, that has an opening portion formed by ion beam processing at a gap end portion on the recording surface side, is narrower than the back surface-side gap width, and thus it is possible to exhibit high recording ability. Details of the method for forming such a write gap will be described later.

Hereinafter, the magnetic recording head will be described in greater detail.

Examples of Configuration of Magnetic Recording Head

Hereinafter, examples of the configuration of the magnetic recording head will be described with reference to the drawings. However, the forms shown in the drawings are just an example, and the present invention is not limited to such forms.

The magnetic recording head may be a ring type magnetic recording head or an inductive head. Generally, the inductive head is also referred to as an electromagnetic induction type head or a magnetic induction type head. In the inductive head, a leakage magnetic field is generated from write gaps of a head core by applying a current to a coil, and by the leakage magnetic field, a magnetization region can be formed on a magnetic layer of a magnetic recording medium.

Figure 7:
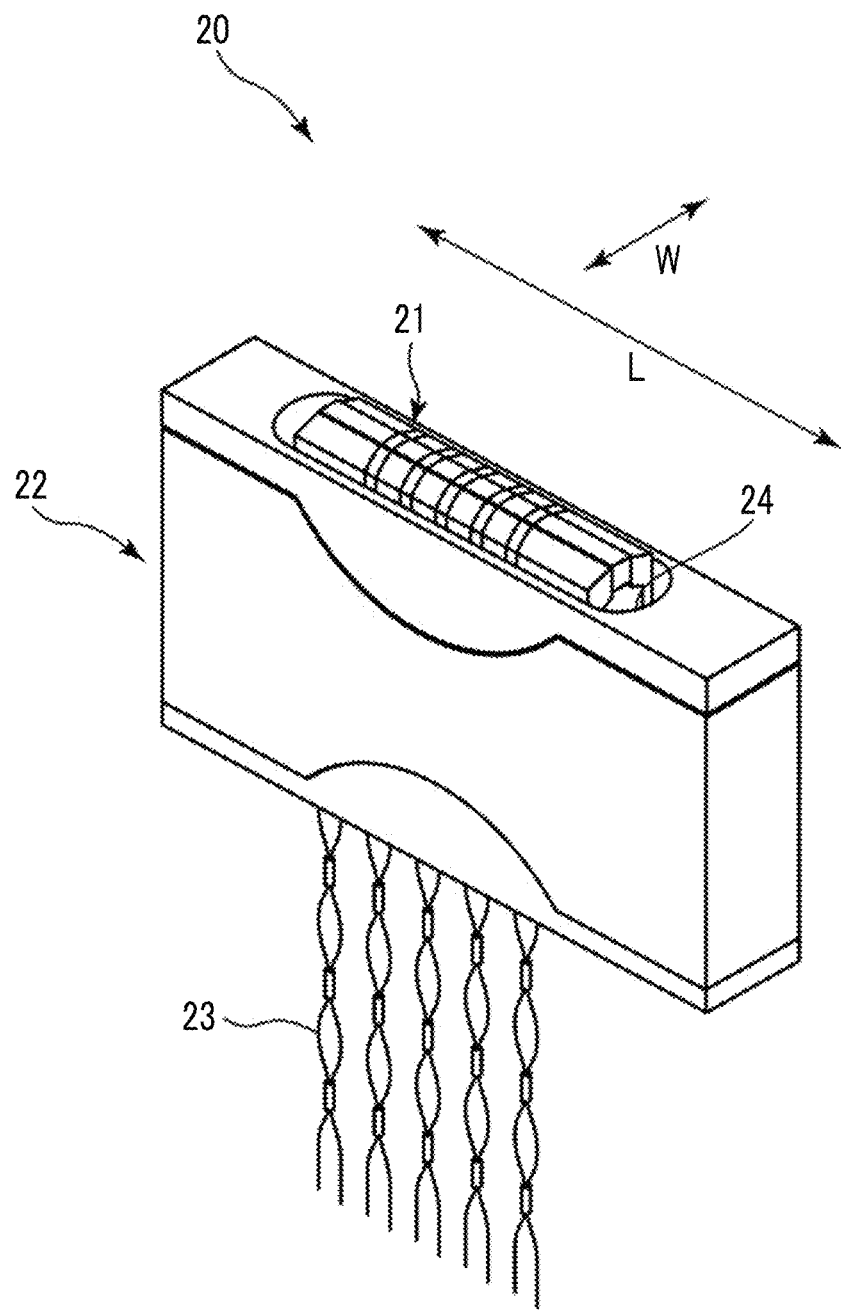
FIG. 7 is a perspective view showing an example of the magnetic recording head.

FIG. 7 is a perspective view showing an example of the magnetic recording head. FIG. 7 is a perspective view of the magnetic recording head observed from the recording surface side. The magnetic recording head 20 shown in FIG. 7 has a head block 21, a shield case 22, and a coil 25 (see FIG. 8).

The shield case 22 is a case for shielding a magnetic field generated from the coil 25 (see FIG. 8) of the magnetic recording head 20 and/or shielding a magnetic field from other external components. The shield case 22 may be a case formed of a known material capable of shielding a magnetic field and having a rectangular parallelepiped shape with a hollow inside.

An upper portion of the shield case 22 is provided with an opening 24 for exposing the head block 21 from the shield case 22. In addition, a lower portion of the shield case 22 is provided with an opening for drawing out a conductive wire 23 connected to the coil 25 to the outside of the shield case 22.

Figure 8:
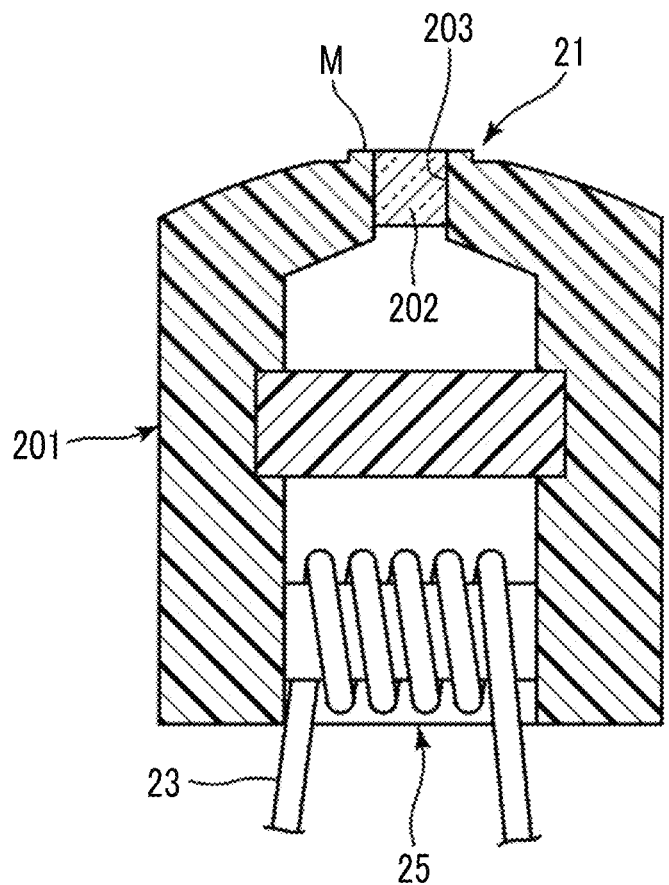
FIG. 8 is a cross-sectional view of the magnetic recording head 20 shown in FIG. 7.

FIG. 8 is a cross-sectional view of the magnetic recording head 20 shown in FIG. 7. The cross-sectional view shown in FIG. 8 is a cross-sectional view in a width direction W that is a direction orthogonal to a longitudinal direction L of the magnetic recording head 20.

The head block 21 has a core portion 201 and a substrate 202 having a magnetic film M on the core portion. In a case where the core portion 201 is excited by the coil 25, the write gap of the magnetic film hinders the magnetic flux passing through the magnetic film. Accordingly, a leakage magnetic field is generated at the position of the write gap. By this leakage magnetic field, it is possible to form a magnetization region in the magnetic layer of the magnetic recording medium, that is, to perform recording.

As a material constituting the core portion 201, a magnetic material that is usually used for a core portion of a ring type magnetic recording head can be used. Examples of the magnetic material include ferrite such as single crystal ferrite and polycrystalline ferrite, and examples of the ferrite include manganese zinc-based ferrite. An opening 203 extending in the vertical direction along the longitudinal direction is formed in the vicinity of the center of the upper portion of the core portion 201 in the width direction. The substrate 202 is disposed inside the opening 203 to fill the opening 203.

Examples of the material of the substrate 202 include non-magnetic materials (for example, various glass materials and various ceramic materials).

Figure 9:
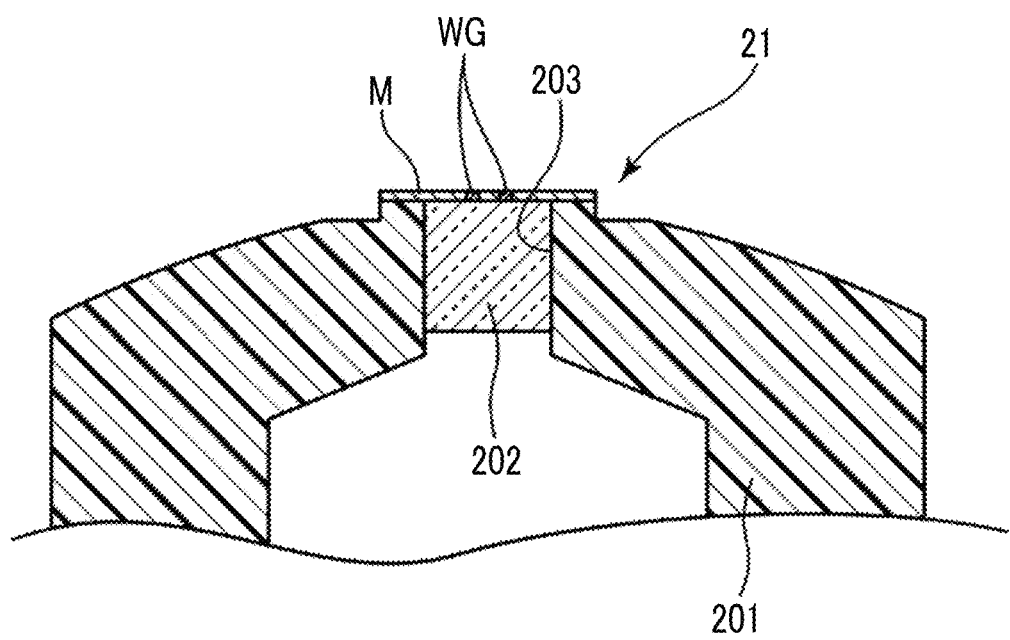
FIG. 9 is a partially enlarged view of the cross-sectional view of the magnetic recording head 20 shown in FIG. 8.

FIG. 9 is a partially enlarged view of the cross-sectional view of the magnetic recording head 20 shown in FIG. 8. Write gaps WG are provided on the magnetic film M provided on the substrate 202.

The magnetic film M may be a metal film. Here, the "metal film" includes an alloy film. The metal film may be a deposition film formed by depositing one or more kinds of metal materials selected from the group consisting of one or more kinds of pure metals and one or more kinds of alloys, may contain one or more kinds of additives, and may contain one or more kinds of impurities mixed inevitably. The magnetic film M may be an iron-based alloy film. Here, "-based" means "including". The iron-based alloy film may preferably be an iron nitride-based alloy film. Examples of the iron nitride-based alloy include those containing, in addition to Fe and N, one or two or more selected from the group consisting of Al, Ta, and the like as constituent elements. The magnetic film may be a deposition film formed by depositing a metal material on the substrate by a known film forming method such as physical vapor deposition (PVD) such as sputtering or vacuum deposition, or chemical vapor deposition (CVD).

The thickness of the magnetic film M may be, for example, 0.5 μm or more, and is preferably 1.0 μm or more, and more preferably 3.0 μm or more from the viewpoint of further improvement in recording ability. In addition, the thickness of the magnetic film M may be, for example, 12.0 μm or less, and is preferably 10.0 μm or less, and more preferably 8.0 μm or less from the viewpoint of easiness in formation of a magnetic film having a uniform film quality.

The thickness of the magnetic film is a thickness at one place randomly selected in a portion having no write gap in the magnetic film of the magnetic recording head. The thickness can be measured by producing a cross-sectional sample of a portion including the magnetic film and performing the measurement in the cross-sectional sample. Regarding specific examples and the like of the method of producing a cross-sectional sample, the above description can be referred to. The measurement can be performed by a known measuring device having a length measurement function such as an SEM.

Figure 10A:
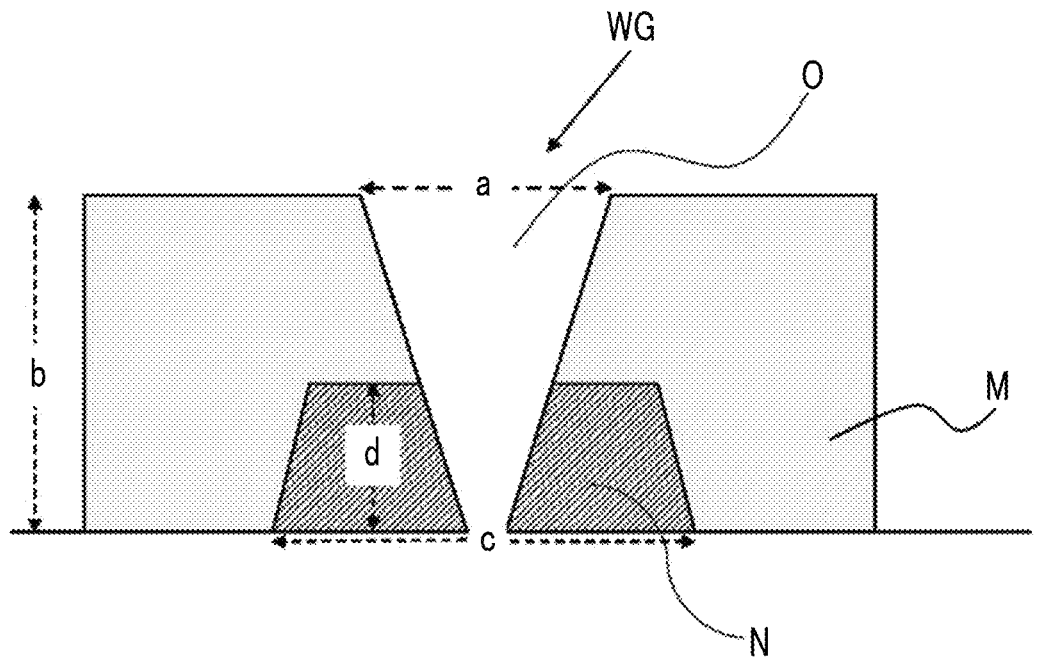
FIG. 10A is an enlarged view (cross-sectional view) of a portion having a write gap in a magnetic film.
Figure 10B:
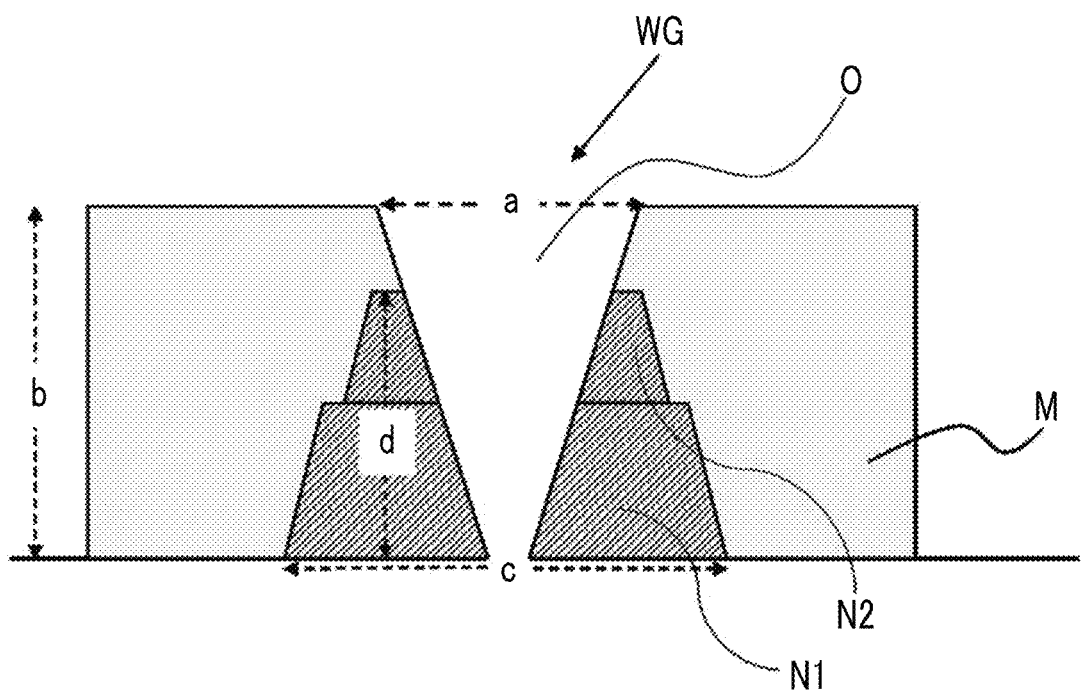
FIG. 10B is an enlarged view (cross-sectional view) of a portion having a write gap in a magnetic film.

FIGS. 10A and 10B are enlarged views (cross-sectional views) of a portion having a write gap in the magnetic film. Hereinafter, FIGS. 10A and 10B are collectively referred to as "FIG. 10".

In FIG. 10, the magnetic film M has a write gap WG. "a" indicates a recording surface-side gap width, "b" indicates a magnetic film thickness, and "c" indicates a back surface-side gap width. The write gap WG has an opening portion O formed by ion beam processing at a gap end portion on the recording surface side. It is preferable that the opening portion formed by ion beam processing is physically opened at least on the recording surface side in the recording surface-side narrow-width write gap of the magnetic recording head, and passes through the magnetic film. FIG. 10 shows an example in which the opening portion O extends to the back surface side. However, the opening portion formed by ion beam processing may not extend to the back surface side in the recording surface-side narrow-width write gap of the magnetic recording head. This is because, as will be described later, a non-magnetic material portion can provide a magnetic spacing.

The write gap WG shown in FIG. 10A has a non-magnetic material portion N at a gap end portion on the back surface side. In FIG. 10A, a layer of the non-magnetic material portion is provided. The write gap WG shown in FIG. 10B is provided with two layers of the non-magnetic material portions (non-magnetic material portions N1 and N2). In the examples shown in FIG. 10, the cross-sectional shape of the non-magnetic material portion is trapezoidal. However, the cross-sectional shape of the non-magnetic material portion is not limited to the trapezoidal shape, and may be any shape such as of an arc shape, a square shape, a rectangle shape, and a multi-stage structure shape.

Examples of the non-magnetic material constituting the non-magnetic material portion include non-magnetic oxides such as a silicon oxide (for example, $SiO_2$) and a titanic acid compound (for example, $CaTiO_3$ and $BaTiO_3$), aluminum, and copper. It is preferable that the non-magnetic material constituting the non-magnetic material portion has a thermal expansion coefficient close to that of the material constituting the core portion. As described above, ferrite can be exemplified as a material constituting the core portion, and from the viewpoint of a thermal expansion coefficient close to that of ferrite, the non-magnetic material constituting the non-magnetic material portion is preferably a non-magnetic oxide, and more preferably a silicon oxide.

The non-magnetic material portion may be a deposition film formed by depositing a non-magnetic material on the substrate by a known film forming method such as physical vapor deposition (PVD) such as sputtering or vacuum deposition, or chemical vapor deposition (CVD). In a case where one write gap includes two or more layers of non-magnetic material portions, the non-magnetic materials constituting the non-magnetic material portion may be the same or different.

The thickness (reference numeral "d" in FIG. 10) of the non-magnetic material portion may be, for example, 3% or more with respect to the thickness (reference numeral b in FIG. 10) of the magnetic film, that is, assuming that the thickness of the magnetic film is 100%. From the viewpoint of further improvement in recording ability, the thickness is preferably 5% or more, more preferably 10% or more, and even more preferably 20% or more. The thickness of the non-magnetic material portion may be, for example, 95% or less with respect to the thickness of the magnetic film, and is preferably 90% or less, more preferably 80% or less, and even more preferably 70% or less from the viewpoint of further improvement in recording ability. In a case where there are two or more layers of non-magnetic material portions, the thickness of the non-magnetic material portion is the total thickness of the two or more layers of non-magnetic material portions. In addition, the thickness of the non-magnetic material portion may be, for example, 0.1 μm or more, and is preferably 0.3 μm or more, and more preferably 0.5 μm or more. In addition, the thickness may be 10.0 μm or less, and is preferably 9.0 μm or less, and more preferably 8.0 μm or less.

In the magnetic recording head, at least one write gap, preferably all the write gaps, are recording surface-side narrow-width write gaps. The thickness of the non-magnetic material portion of the recording surface-side narrow-width write gap, described regarding the magnetic recording head, refers to an arithmetic average of the thicknesses of the non-magnetic material portions of all the recording surface-side narrow-width write gaps having a non-magnetic material portion included in the magnetic recording head. The arithmetic average may be within the above range, and is preferably within the above range. The measurement of the thickness of the non-magnetic material portion for obtaining the arithmetic average in the recording surface-side narrow-width write gaps having a non-magnetic material portion is performed at one place randomly selected in the non-magnetic material portion. The thickness of the non-magnetic material portion can be measured by producing a cross-sectional sample of a portion including the non-magnetic material portion and performing the measurement in the cross-sectional sample. The measurement can be performed by a known measuring device having a length measurement function such as an SEM. In addition, the thickness of the non-magnetic material portion of the recording surface-side narrow-width write gaps having a non-magnetic material portion may also be within the above-described range, and is preferably within the above-described range.

In the examples shown in FIG. 10, the opening portion formed by ion beam processing passes through the non-magnetic material portion. Therefore, an opening portion formed by ion beam processing also exists at the gap end portion on the back surface side. However, since the gap width means the width of a magnetic spacing, the back surface-side gap width is the width of the non-magnetic material portion (reference numeral "c" in FIG. 10). In addition, the magnetic recording head is not limited to the form in which the opening portion formed by ion beam processing penetrates the non-magnetic material portion, and the non-magnetic material portion existing in at least a part including the gap end portion on the back surface side may include a solid portion having no physical opening portion.

A magnetic recording head having a recording surface-side narrow-width write gap including the non-magnetic material portion described above can be manufactured by, for example, a manufacturing method described below.

Manufacturing Method of Magnetic Recording Head

The magnetic recording head can be manufactured by a manufacturing method including: forming a non-magnetic material portion on a substrate; forming a magnetic film to cover the non-magnetic material portion on the substrate; and forming an opening portion by ion beam processing in a portion of the magnetic film in which a write gap is required to be formed. The portion to be subjected to ion beam processing has the non-magnetic material portion between the magnetic film and the substrate. According to such a manufacturing method, it is possible to manufacture a magnetic recording head having a write gap having an opening portion formed by ion beam processing at a gap end portion on the recording surface side and a non-magnetic material portion at a gap end portion on the back surface side.

Figure 11A:
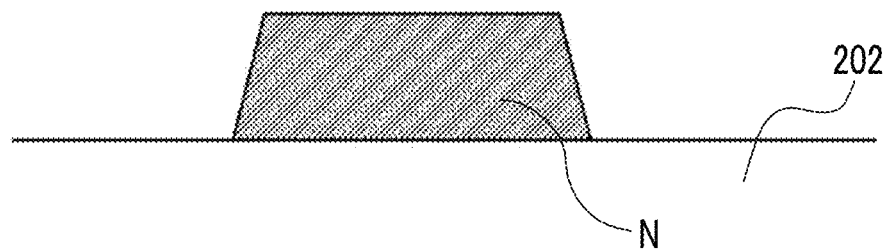
FIGS. 11A to 11C are diagrams explaining a method of forming the write gap shown in FIG. 10A.
Figure 11B:
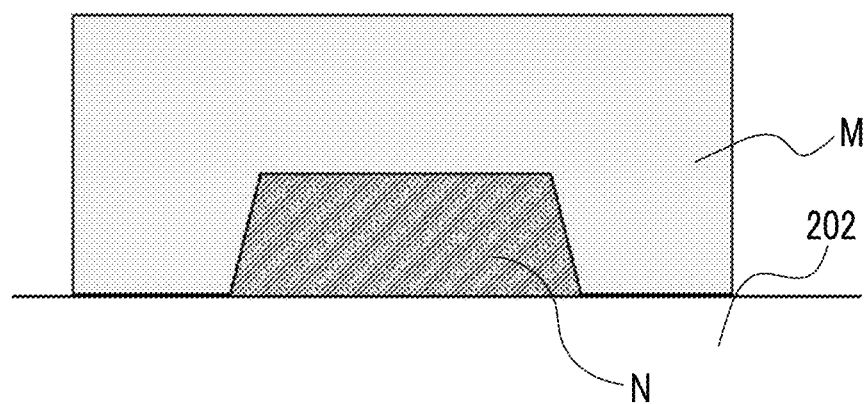
Figure 11C:
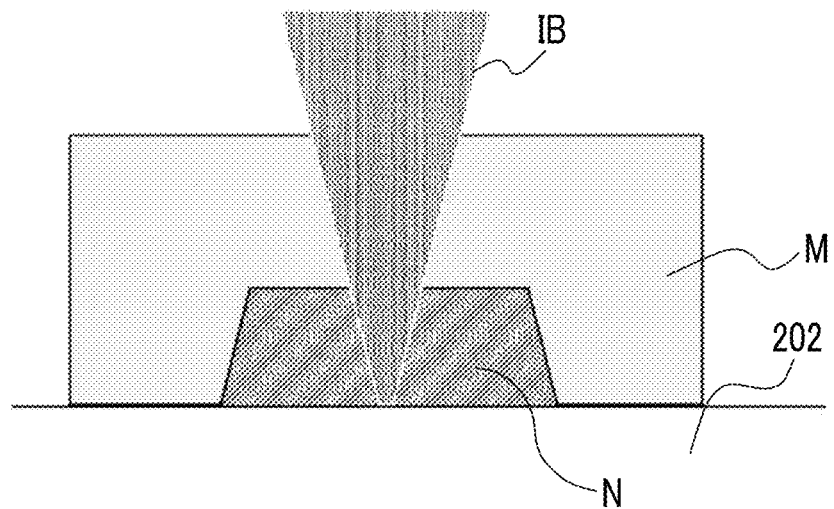

FIGS. 11A to 11C are diagrams explaining a method of forming the write gap shown in FIG. 10A. Hereinafter, an example of the manufacturing method will be described with reference to FIGS. 11A to 11C. However, the manufacturing method is not limited to the form shown in FIGS. 11A to 11C.

First, a non-magnetic material portion N is formed on a substrate 202 disposed inside an opening 203 of a core portion 201 (FIG. 11A). Examples of the method of forming the non-magnetic material portion N on the substrate 202 include a method including forming a continuous layer of a non-magnetic material on the substrate 202, and then forming a non-magnetic material portion N as a pattern of the non-magnetic material by a known patterning method such as a lithography process. The non-magnetic material constituting the non-magnetic material portion and the thickness are as described above. Regarding a method of forming the continuous layer of the non-magnetic material, the above description of the non-magnetic material portion of the write gap can be referred to. Since the width of the non-magnetic material portion N (pattern) is a back surface-side gap width of a write gap to be formed, the back surface-side gap width can be controlled by adjusting the size of the pattern.

In a case where two or more layers of non-magnetic material portions are provided as in the example shown in FIG. 10B, for example, a method including patterning a continuous layer of a non-magnetic material as a first layer, and then forming a layer of a non-magnetic material as a second layer in a patterned manner on the pattern of the formed non-magnetic material can be employed. Otherwise, two continuous layers of non-magnetic materials may be laminated and formed, and then patterned.

Next, a magnetic film M is formed on the substrate 202 to cover the non-magnetic material portion N (FIG. 11B). The thickness of the magnetic film and the film forming method are as described above. Here, the magnetic film is formed not only on the substrate 202 but also on the surface of the core portion 201. Accordingly, as shown in FIG. 9, the magnetic film M can be provided on the recording surface side of the core portion 201.

Then, ion beam processing is performed by applying ion beams IB toward the surface of the magnetic film on the recording surface side (FIG. 11C). In this manner, an opening portion can be formed. The opening portion thus formed has a width that becomes narrower in a depth direction due to the characteristics of the ion beam processing. Since the non-magnetic material portion is provided as described above, a write gap in which the recording surface-side gap width is narrower than the back surface-side gap width can be formed by making the width of the pattern of the non-magnetic material portion N larger than the opening width of the opening portion formed on the recording surface side by ion beam processing.

The ion beam processing can be performed by known ion beam processing capable of forming an opening portion by irradiating a processing target with ion beams. The ion beam processing can be performed by processing that is generally referred to as ion milling, and from the viewpoint of processing accuracy and the like, focused ion beam (FIB) processing is preferable. The ion beams are beams in which ions are accelerated by an electric field, and the focused ion beams are ion beams in which ion beams are focused by a lens or the like. The focused ion beam processing is also generally referred to as FIB processing. The focused ion beam processing can be performed using a focused ion beam device having a commercially available or known configuration. The processing conditions may be set according to the kind of the material of the processing target, film thickness, and the like.

Regarding other details of the manufacturing method, known technologies related to the manufacturing of a magnetic recording head can be employed.

Magnetic Recording Apparatus

An aspect of the present invention relates to a magnetic recording apparatus including the magnetic recording head.

A magnetic recording apparatus that has a servo write head and forms a servo pattern on a magnetic layer of a magnetic recording medium by the servo write head is a servo writer. The magnetic recording apparatus can be a servo writer in one embodiment.

Figure 12:
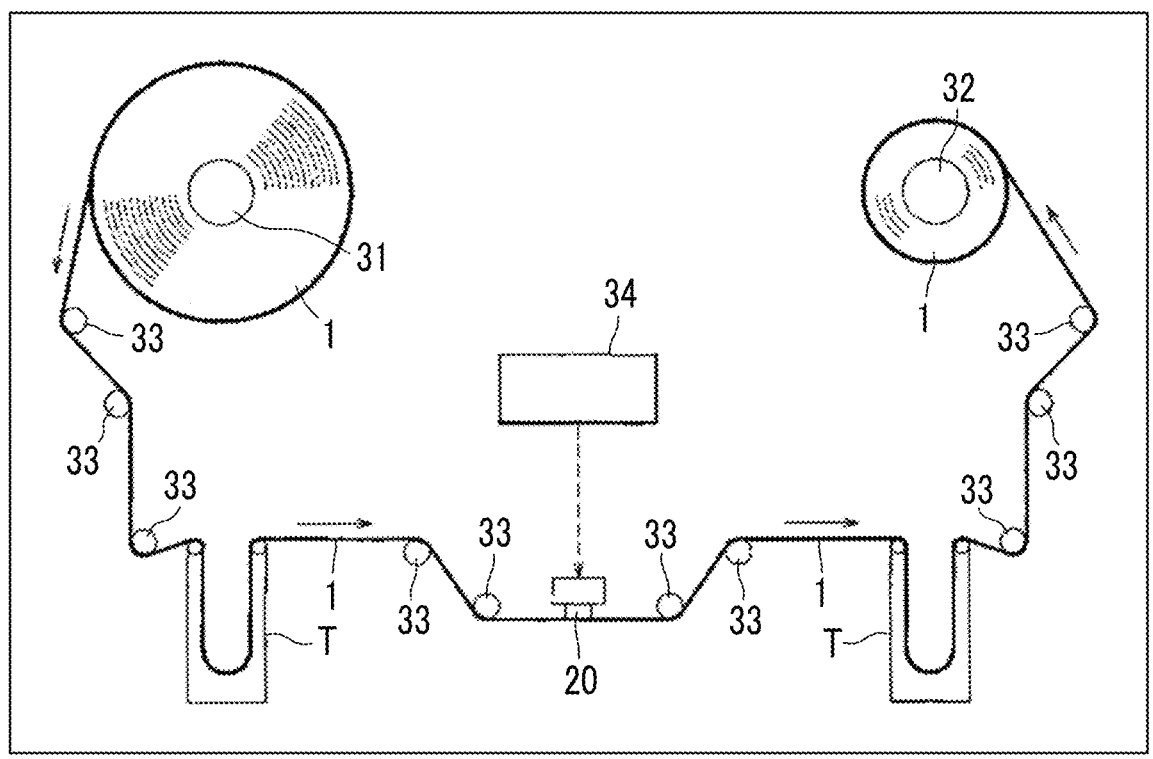
FIG. 12 is schematic diagram showing a configuration of a servo writer.

FIG. 12 is a schematic diagram showing a configuration of a servo writer. A servo writer 30 shown in FIG. 12 has a reel 31 that sends out a magnetic tape 1 before the formation of a servo pattern, and a reel 32 that winds up the magnetic tape 1 on which the servo pattern is formed. The arrow in FIG. 12 indicates a transport direction of the magnetic tape 1. A plurality of guides 33 and tension adjusters T that adjust the tension of the magnetic tape 1 that is transported are arranged in the transport passage of the magnetic tape 1. A magnetic recording head (servo write head) 20 forms a servo pattern on a magnetic layer of the magnetic tape 1 that is transported. A write signal generation circuit 34 transmits a pulse signal for forming a servo pattern to the magnetic recording head (servo write head) 20. Accordingly, a leakage magnetic field is generated from write gaps WG of the magnetic recording head (servo write head) 20, and due to the leakage magnetic field, a magnetization region (servo pattern) can be formed on a magnetic layer of a magnetic recording medium.

Manufacturing Method of Magnetic Recording
Medium on Which Servo Pattern is Formed An aspect of the present invention relates to a manufacturing method of a magnetic recording medium having a servo pattern, including forming a servo pattern on the magnetic recording medium by the magnetic recording head.

Formation of Servo Pattern

In order to form a servo pattern, for example, a servo writer shown in FIG. 12 can be used. However, the present invention is not limited thereto.

A servo pattern to be formed may be, in one form, a timing-based servo pattern. As shown in the European Computer Manufacturers Association (ECMA)-319 (June, 2001), a timing-based servo system is employed in a magnetic tape (generally referred to as "LTO tape") based on Linear Tape-Open (LTO) standards. In this timing-based servo system, a plurality of pairs of magnetic stripes (also referred to as "servo stripes") that are not-parallel to each other are continuously arranged in a longitudinal direction of the magnetic tape, and thus a servo pattern is formed. The reason why the servo pattern is composed of a pair of magnetic stripes that are not parallel to each other as described above is to inform a servo signal reading element passing over the servo pattern of the passing position of the servo signal reading element. Specifically, the pair of magnetic stripes are formed so that a spacing thereof continuously changes along a width direction of the magnetic tape, and by reading the spacing with the servo signal reading element, it is possible to know a relative position between the servo pattern and the servo signal reading element. This relative position information enables tracking of data tracks. Therefore, a plurality of servo tracks are usually set on the servo pattern along the width direction of the magnetic tape.

A servo band is composed of a servo pattern that is continuous in the longitudinal direction of the magnetic tape. Usually, a magnetic tape is provided with a plurality of the servo bands. For example, the number of servo bands is five in an LTO tape. A region interposed between two adjacent servo bands is a data band. The data band is composed of a plurality of data tracks, and each data track corresponds to each servo track.

In addition, in one embodiment, each servo band is embedded with information indicating a servo band number (also referred to as "servo band identification (ID)" or "Unique DataBand Identification Method (UDIM) information") as shown in JP2004-318983A. The servo band ID is recorded by shifting a specific one of a plurality of pairs of servo stripes in the servo band so that the position of the specific one is relatively displaced in the longitudinal direction of the magnetic tape. Specifically, the way of shifting a specific one of a plurality of pairs of servo stripes is changed for each servo band. Accordingly, the recorded servo band ID is unique for each servo band. Thus, only by reading one servo band with the servo signal reading element, the servo band can be uniquely specified.

As a method of uniquely specifying the servo band, a method using a staggered method as shown in ECMA-319 (June, 2001) is also used. In this staggered method, a group of a plurality of pairs of magnetic stripes (servo stripes) that are not-parallel to each other, continuously arranged in the longitudinal direction of the magnetic tape, is recorded so as to be shifted in the longitudinal direction of the magnetic tape for each servo band. Since the combination of shifting ways between adjacent servo bands is unique in the entire magnetic tape, it is also possible to uniquely specify servo bands in a case where two servo signal reading elements read servo patterns.

In addition, each servo band is usually also embedded with information indicating a position of the magnetic tape in the longitudinal direction (also referred to as "Longitudinal Position (LPOS) information") as shown in ECMA-319 (June, 2001). Similar to the UDIM information, the LPOS information is also recorded by shifting positions of a pair of servo stripes in the longitudinal direction of the magnetic tape. However, unlike in the case of the UDIM information, in the case of the LPOS information, the same signal is recorded in each servo band.

The servo band can also be embedded with other information different from the UDIM information and LPOS information. In this case, the embedded information may be different for each servo band as in the case of the UDIM information, or may be common to all the servo bands as in the case of the LPOS information.

In addition, a method other than the above method can also be employed as a method of embedding information in the servo band. For example, a predetermined code may be recorded by thinning out a predetermined pair from a group of pairs of servo stripes.

The magnetic tape is usually subjected to a demagnetization (erase) process before the formation of the servo pattern on the magnetic tape. The erase process can be performed by applying a uniform magnetic field to the magnetic tape using a DC magnet or an AC magnet. The erase process includes Direct Current (DC) erasing and Alternating Current (AC) erasing. AC erasing is performed by, while reversing the direction of a magnetic field that is applied to the magnetic tape, gradually reducing the strength of the magnetic field. DC erasing is performed by applying a magnetic field in one direction to the magnetic tape. There are two further methods for DC erasing. A first method is horizontal DC erasing in which a magnetic field in one direction is applied along the longitudinal direction of the magnetic tape. A second method is vertical DC erasing in which a magnetic field in one direction is applied along the thickness direction of the magnetic tape. The erasing process may be performed on the entire magnetic tape or for each servo band of the magnetic tape.

The direction of the magnetic field of the servo pattern formed is determined according to the direction of the erasing. For example, in a case where the magnetic tape is subjected to horizontal DC erasing, the servo pattern is formed so that the direction of the magnetic field is opposite to the direction of the erasing. Accordingly, it is possible to increase the output of the servo signal obtained by reading the servo pattern. As shown in JP2012-53940A, in a case where a magnetic pattern is transferred to the magnetic tape subjected to vertical DC erasing using the gaps, the servo signal obtained by reading the servo pattern thus formed has a unipolar pulse shape. In a case where a magnetic pattern is transferred to the magnetic tape subjected to horizontal DC erasing using the gaps, the servo signal obtained by reading the servo pattern thus formed has a bipolar pulse shape.

Magnetic Recording Medium on Which Servo
Pattern is Formed

The magnetic recording medium includes a tape-like magnetic recording medium (that is, magnetic tape) and a disk-like magnetic tape (that is, magnetic disk). In addition, in general, the magnetic recording medium is largely classified into a coating type and a metal thin film type. The magnetic recording medium on which a servo pattern is formed by the magnetic recording head may be a magnetic tape or a magnetic disk, and is preferably a magnetic tape. In addition, the magnetic recording medium may be a coating type magnetic recording medium or a metal thin film type magnetic recording medium. The magnetic recording medium usually has a non-magnetic support and a magnetic layer containing a ferromagnetic powder. The magnetic recording medium may have a non-magnetic layer containing a non-magnetic powder between the non-magnetic support and the magnetic layer, and may also have a back coating layer containing a non-magnetic powder on the surface side opposite to the surface side of the non-magnetic support having the magnetic layer. In the coating type magnetic recording medium, the magnetic layer, the non-magnetic layer, and the back coating layer contain a binder, and may optionally contain one or more kinds of additives. The metal thin film type magnetic recording medium may have, for example, a magnetic layer formed by a sputtering method.

The magnetic recording head has a write gap including an opening portion formed by ion beam processing and can exhibit high recording ability. Therefore, it is suitable as a magnetic recording head for performing recording on a magnetic layer of a magnetic recording medium having high coercivity. Regarding the coercivity of the magnetic recording medium, the magnetic recording head is suitable as, for example, a magnetic recording head for performing recording on a magnetic layer of a magnetic recording medium having vertical coercivity of 2,800 Oe or more. The magnetic recording head is more preferably suitable for recording on a magnetic layer of a magnetic recording medium having vertical coercivity of 3,000 Oe or more, and even more preferably suitable for recording on a magnetic layer of a magnetic recording medium having vertical coercivity of 3,500 Oe or more. The vertical coercivity of the magnetic recording medium may be, for example, 5,000 Oe or less. However, it may exceed the above-described value. The magnetic recording head can also be applied to the recording on a magnetic layer of a magnetic recording medium having low coercivity. The unit is 1 oersted (1 Oe)=79.6 A/m.

In the present invention and the present specification, the "vertical coercivity" of a magnetic recording medium is coercivity that is measured in the vertical direction of the magnetic recording medium. "Vertical" described with respect to the coercivity means a direction orthogonal to the surface of the magnetic layer, and may also be a thickness direction. In the present invention and the present specification, the vertical coercivity of a magnetic recording medium is a value obtained by the following method using an oscillating sample type magnetometer.

A sample piece having a size that can be introduced into an oscillating sample type magnetometer from a magnetic recording medium to be measured is cut out. Using the oscillating sample type magnetometer, a magnetic field is applied in a vertical direction of the sample piece (a direction orthogonal to the surface of the magnetic layer) at a maximum applied magnetic field of 3,979 kA/m, a measurement temperature of 296 K, and a magnetic field sweep rate of 8.3 kA/m/sec. The magnetization intensity of the sample piece with respect to the applied magnetic field is measured. The measured value is obtained as a value obtained by subtracting the magnetization of the sample probe of the oscillating sample type magnetometer as background noise. The coercivity (vertical coercivity) is obtained from the applied magnetic field at which the magnetization intensity becomes zero. The measurement temperature is a temperature of the sample piece. The atmospheric temperature around the sample piece is adjusted to 296 K to provide temperature equilibrium, and thus the temperature of the sample piece can be adjusted to 296 K (measurement temperature).

Examples of the ferromagnetic powder contained in the magnetic layer of the magnetic recording medium include a hexagonal ferrite powder and an ε-iron oxide powder.

In the present invention and the present specification, the "hexagonal ferrite powder" refers to a ferromagnetic powder from which a hexagonal ferrite type crystal structure is detected as a main phase by X-ray diffraction analysis. The main phase refers to a structure to which the diffraction peak with the highest intensity in an X-ray diffraction spectrum obtained by X-ray diffraction analysis is assigned. For example, in a case where the diffraction peak with the highest intensity in an X-ray diffraction spectrum obtained by X-ray diffraction analysis is assigned to the hexagonal ferrite type crystal structure, it is determined that the hexagonal ferrite type crystal structure is detected as a main phase. In a case where a single structure is only detected by X-ray diffraction analysis, this detected structure is determined as a main phase. The hexagonal ferrite type crystal structure at least contains, as constituent atoms, an iron atom, a divalent metal atom, and an oxygen atom. The divalent metal atom is a metal atom that can convert into a divalent cation as an ion thereof, and examples thereof include alkaline earth metal atoms such as a strontium atom, a barium atom, and a calcium atom, and a lead atom. In the present invention and the present specification, the "hexagonal strontium ferrite powder" refers to a powder in which a main divalent metal atom contained therein is a strontium atom, and the "hexagonal barium ferrite powder" refers to a powder in which a main divalent metal atom contained therein is a barium atom. The main divalent metal atom refers to a divalent metal atom having the highest content in terms of atom % among divalent metal atoms contained in this powder. However, the divalent metal atom does not include rare earth atoms. In the present invention and the present specification, the "rare earth atoms" are selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

In the present invention and the present specification, the "ε-iron oxide powder" refers to a ferromagnetic powder from which an ε-iron oxide type crystal structure is detected as a main phase by X-ray diffraction analysis. For example, in a case where the diffraction peak with the highest intensity in an X-ray diffraction spectrum obtained by X-ray diffraction analysis is assigned to the ε-iron oxide type crystal structure, it is determined that the ε-iron oxide type crystal structure is detected as a main phase. The ε-iron oxide powder includes a substituted ε-iron oxide powder in which a part of Fe is substituted with substitutional atoms such as Ga, Co, Ti, Al, and Rh, and an unsubstituted ε-iron oxide powder that does not contain such substitutional atoms.

Regarding other details of the magnetic recording medium on which a servo pattern is formed by the magnetic recording head, known technologies can be applied.

EXAMPLES

Hereinafter, the present invention will be described based on examples. However, the present invention is not limited to the embodiments shown in the examples.

Production of Head A

As a head A, a magnetic recording head of the examples shown in FIGS. 8, 9, and 10A was produced.

The material of a core portion 201 is manganese zinc-based ferrite, and the material of a substrate 202 is a silicon oxide.

A continuous layer of a silicon oxide was formed on the substrate 202 by a sputtering method using $SiO_2$ as a sputtering target, and then patterned by a lithography process to form a silicon oxide pattern N (FIG. 11A).

Then, a magnetic film (a continuous layer of a Ta-containing iron nitride-based alloy (Fe content: 80 atom % or more)) was formed on the substrate 202 by a sputtering method to cover the silicon oxide pattern N (FIG. 11B).

After the film formation, image pick-up was performed on a surface of the magnetic film on the recording surface side by a scanning ion microscope (SIM) to specify a processing target region for FIB processing, and an SIM image was obtained. The processing target region was designated using the SIM image, and FIB processing was performed on the designated region by a focused ion beam device to form an opening portion in a portion of the magnetic film in which a write gap was required to be formed (a portion including the silicon oxide pattern N between the magnetic film and the substrate) (FIG. 11C). The FIB processing was performed under the following conditions.

Focused Ion Beam Device: FB-2200 manufactured by Hitachi High-Tech Corporation Acceleration Voltage: 30 kV
Focusing Lens: present
Aperture Diameter: 80 μm
Dwell Time (irradiation time per pixel): 5 μsec In this manner, a magnetic recording head having a total of 10 write gaps WG arranged as shown in FIG. 5 was produced. Five write gaps having a shape of "/" were produced under the same conditions, and five write gaps having a shape of "\" were produced under the same conditions.

Production of Heads B to N

A recording surface-side gap width a of the write gap can be adjusted according to the processing conditions of the FIB processing.

A thickness b of the magnetic film can be adjusted by changing the film forming conditions of the sputtering method.

Since a back surface-side gap width c corresponds to a width of the silicon oxide pattern formed by patterning, the gap width c can be adjusted depending on the patterning conditions.

A thickness d of a non-magnetic material portion can be adjusted by changing the film forming conditions of the sputtering method in the formation of the continuous layer of the silicon oxide.

Heads B to N were produced in the same manner as in the production of the head A, except that one or more of the above conditions were changed.

Production of Head O

A head O having a write gap of the example shown in FIG. 10B was produced in the same manner as in the production of the head A, except that a silicon oxide pattern as a first layer was produced in the same manner as the head A, and then a silicon oxide was formed in a patterned manner on the pattern by a sputtering method.

Production of Head P

A head P was produced in the same manner as in the production of the head A, except that a magnetic film was directly formed on the substrate 202 without the formation and patterning of a continuous layer of a silicon oxide.

A plurality of the heads A to P were produced by the above methods, respectively. One of the plurality of heads was used for the following various measurement, and the others were used for the following recording test.

Various Measurement

Recording Surface-Side Gap Width a

Each of the heads A to P was observed from the recording surface side, and for each of ten write gaps, a gap width at an end portion on the recording surface side in a direction orthogonal to the azimuth angle direction (that is, an opening width at an end portion on the recording surface side of an opening portion formed by FIB processing) was measured by a laser microscope (VK-8700 manufactured by Keyence Corporation) at three places, i.e., a place in the vicinity of the central portion, a place in the vicinity of one end portion (a place about 10 μm away from the end portion), and a place in the vicinity of the other end portion (a place about 10 μm away from the end portion). The measurement conditions were controlled so that the objective lens magnification was 150 times and the measurement step in the X-Y direction was 0.01 μm.

An arithmetic average of the measured values (10×3=30 in total) obtained in the ten write gaps was obtained. The calculated value is shown as a recording surface-side gap width a in Table 1.

In addition, in the ten write gaps, the arithmetic average of the measured values obtained by the measurement at three places in each write gap was also the value shown in Table 1.

Thickness b of Magnetic Film

A cross-sectional sample of each of the heads A to P was produced, and in the produced cross-sectional sample, the thickness was measured by SEM at one place randomly selected in a portion having no write gap in the magnetic film under the following conditions. The following conditions were also employed as the measurement conditions using the SEM described below. The measured value is shown as a thickness b of the magnetic film in Table 1.

Device: s-4800 manufactured by Hitachi High-Tech Corporation
Acceleration Voltage: 5 kV
Magnification: The magnification is selected within a range of 100 to 2,000 times so that the object to be measured is generally appropriately put within the observation visual field of the SEM.
Measurement: Measurement by comparison with the scale bar displayed on the SEM

Back Surface-Side Gap Width c

In each of the heads A to O, for each of ten write gaps, a cross-sectional sample was produced by exposing a cross-section in a direction orthogonal to the azimuth angle direction at three places, i.e., a place in the vicinity of the central portion, a place in the vicinity of one end portion (a place about 10 μm away from the end portion), and a place in the vicinity of the other end portion (a place about 10 μm away from the end portion). Using these cross-sectional samples, a gap width at an end portion on the back surface side in a direction orthogonal to the azimuth angle direction (that is, a width of the non-magnetic material portion (c in FIG. 10)) was measured by SEM.

In the head P, for each of ten write gaps, a cross-sectional sample was produced by exposing a cross-section in a direction orthogonal to the azimuth angle direction at three places, i.e., a place in the vicinity of the central portion, a place in the vicinity of one end portion (a place about 10 μm away from the end portion), and a place in the vicinity of the other end portion (a place about 10 μm away from the end portion). Using these cross-sectional samples, a gap width at an end portion on the back surface side in a direction orthogonal to the azimuth angle direction (that is, an opening width at an end portion on the back surface side of an opening portion formed by FIB processing) was measured by SEM.

An arithmetic average of the measured values (10×3=30 in total) obtained in the ten write gaps was obtained. The calculated value is shown as a back surface-side gap width c in Table 1.

In addition, in the ten write gaps, the arithmetic average of the measured values obtained by the measurement at three places in each write gap was also the value shown in Table 1.

Thickness d of Non-Magnetic Material Portion

In the heads A to O, a thickness d of the non-magnetic material portion was obtained by the following method.

In each head, for each of ten write gaps, a cross-sectional sample was produced at one randomly selected place, and a thickness of the non-magnetic material portion (silicon oxide) in the cross-sectional sample was measured by SEM.

An arithmetic average of the measured values (10×1=10 in total) obtained in the ten write gaps was obtained. The calculated value is shown as a thickness d of the non-magnetic material portion in Table 1.

In addition, in the ten write gaps, the measured value obtained by the measurement at the one place in each write gap was also the values shown in Table 1.

Recording Test (Test Examples 1 to 22, Reference Test Example 1, and Comparative Test Example 1)

A recording test was performed for evaluating whether the saturated recording is possible with the combination of the head and the magnetic tape shown in Table 1. In the test, a servo writer having the configuration shown in FIG. 12 was used to transport the magnetic tape, and a reproducing head used in an LTO-Gen (Generation) 8 drive was used as a reproducing head. A reproduction signal obtained from the magnetic tape in a case where the value of a pulse current is continuously increased from 10 mA to 50 mA is measured, and it is determined that saturated recording is made when the amplitude of the reproduction signal does not increase even with an increase of the value of the pulse current and begins to decrease slightly. Table 1 shows the test results, in which a case where it was determined that the saturated recording was made was represented by "OK" and a case where it was not determined that the saturated recording was made was represented by "NG".

In Table 1, "BaFe" in the column of "Ferromagnetic Powder of Magnetic Recording Medium" indicates a hexagonal barium ferrite powder, and "SrFe" indicates a hexagonal strontium ferrite powder. Each magnetic recording medium shown in Table 1 is a coating type magnetic tape, and has a non-magnetic layer and a magnetic layer in this order on one surface side of a non-magnetic support, and a back coating layer on the other surface side.

The vertical coercivity of the magnetic recording medium in Table 1 is a value obtained by the following method.

A sample piece was cut out from each magnetic tape. Vertical coercivity of the sample piece was obtained by the above-described method using a TM-TRVSM5050-SMSL type manufactured by TAMAKAWA CO., LTD as an oscillating sample type magnetometer.

The above results are shown in Table 1 (Table 1-1 and Table 1-2).

TABLE 1

|  | Unit | Reference Test Example 1 | Comparative Test Example 1 | Test Example 1 | Test Example 2 | Test Example 3 | Test Example 4 | Test Example 5 | Test Example 6 | Test Example 7 | Test Example 8 |
|---|---|---|---|---|---|---|---|---|---|---|---|
| Head No. |  | Head P | Head P | Head A | Head A | Head B | Head B | Head C | Head C | Head D | Head D |
| Number of Layers of Non-Magnetic Material Portions | — | None | None | 1 | 1 | 1 | 1 | 1 | 1 | 1 | 1 |
| Recording Surface-Side Gap Width a | μm | 1.0 | 1.0 | 1.0 | 1.0 | 2.0 | 2.0 | 1.0 | 1.0 | 1.0 | 1.0 |
| Thickness b of Magnetic Film | μm | 5.0 | 5.0 | 5.0 | 5.0 | 5.0 | 5.0 | 0.8 | 0.8 | 5.0 | 5.0 |
| Back Surface-Side Gap Width c | μm | 0.65 | 0.65 | 10.0 | 10.0 | 10.0 | 10.0 | 10.0 | 10.0 | 25.0 | 25.0 |
| Back Surface-Side Gap Width c/Recording Surface-Side Gap Width a |  | 0.65 | 0.65 | 10.0 | 10.0 | 5.0 | 5.0 | 10.0 | 10.0 | 25.0 | 25.0 |
| Thickness d of Non-Magnetic Material Portion | μm | — | — | 0.5 | 0.5 | 0.5 | 0.5 | 0.5 | 0.5 | 0.5 | 0.5 |
| Thickness of Non-Magnetic Material Portion with respect to Thickness of Magnetic Film | % | — | — | 10% | 10% | 10% | 10% | 63% | 63% | 10% | 10% |
| Ferromagnetic Powder of Magnetic Recording Medium |  | BaFe | BaFe | BaFe | BaFe | BaFe | BaFe | BaFe | BaFe | BaFe | BaFe |

TABLE 1-continued

| | Unit | | | | | | | | | |
|---|---|---|---|---|---|---|---|---|---|---|
| Vertical Coercivity of Magnetic Recording Medium | Oe | 2532 | 2945 | 2532 | 2945 | 2945 | 3490 | 2945 | 3490 | 2945 | 3490 |
| Whether Saturated Recording is Made | | OK | NG | OK | OK | OK | NG | OK | NG | OK | NG |

| | Unit | Test Example 9 | Test Example 10 | Test Example 11 | Test Example 12 | Test Example 13 | Test Example 14 | Test Example 15 |
|---|---|---|---|---|---|---|---|---|
| Head No. | | Head E | Head E | Head F | Head F | Head G | Head G | Head H |
| Number of Layers of Non-Magnetic Material Portions | — | 1 | 1 | 1 | 1 | 1 | 1 | 1 |
| Recording Surface-Side Gap Width a | μm | 1.0 | 1.0 | 1.0 | 1.0 | 1.0 | 1.0 | 0.2 |
| Thickness b of Magnetic Film | μm | 5.0 | 5.0 | 10.0 | 10.0 | 5.0 | 5.0 | 5.0 |
| Back Surface-Side Gap Width c | μm | 10.0 | 10.0 | 10.0 | 10.0 | 10.0 | 10.0 | 10.0 |
| Back Surface-Side Gap Width c/Recording Surface-Side Gap Width a | | 10.0 | 10.0 | 10.0 | 10.0 | 10.0 | 10.0 | 50.0 |
| Thickness d of Non-Magnetic Material Portion | μm | 0.2 | 0.2 | 9.5 | 9.5 | 0.5 | 0.5 | 0.5 |
| Thickness of Non-Magnetic Material Portion with respect to Thickness of Magnetic Film | % | 4% | 4% | 95% | 95% | 10% | 10% | 10% |
| Ferromagnetic Powder of Magnetic Recording Medium | | BaFe | BaFe | BaFe | BaFe | BaFe | SrFe | SrFe |
| Vertical Coercivity of Magnetic Recording Medium | Oe | 2945 | 3490 | 2945 | 3490 | 3490 | 3994 | 3994 |
| Whether Saturated Recording is Made | | OK | NG | OK | NG | OK | OK | OK |

| | Unit | Test Example 16 | Test Example 17 | Test Example 18 | Test Example 19 | Test Example 20 | Test Example 21 | Test Example 22 |
|---|---|---|---|---|---|---|---|---|
| Head No. | | Head I | Head J | Head K | Head L | Head M | Head N | Head O |
| Number of Layers of Non-Magnetic Material Portions | — | 1 | 1 | 1 | 1 | 1 | 1 | 2 |
| Recording Surface-Side Gap Width a | μm | 1.5 | 1.0 | 1.0 | 1.0 | 1.0 | 1.0 | 1.0 |
| Thickness b of Magnetic Film | μm | 5.0 | 1.0 | 10.0 | 5.0 | 5.0 | 5.0 | 5.0 |
| Back Surface-Side Gap Width c | μm | 10.0 | 10.0 | 10.0 | 2.0 | 20.0 | 10.0 | 10.0 |
| Back Surface-Side Gap Width c/Recording Surface-Side Gap Width a | | 6.7 | 10.0 | 10.0 | 2.0 | 20.0 | 10.0 | 10.0 |
| Thickness d of Non-Magnetic Material Portion | μm | 0.5 | 0.5 | 0.5 | 0.5 | 0.5 | 4.5 | 1.0 |
| Thickness of Non-Magnetic Material Portion with respect to Thickness of Magnetic Film | % | 10% | 50% | 5% | 10% | 10% | 90% | 20% |
| Ferromagnetic Powder of Magnetic Recording Medium | | SrFe | Srfe | SrFe | SrFe | SrFe | SrFe | SrFe |
| Vertical Coercivity of Magnetic Recording Medium | Oe | 3994 | 3994 | 3994 | 3994 | 3994 | 3994 | 3994 |
| Whether Saturated Recording is Made | | OK | OK | OK | OK | OK | OK | OK |

In the head P, all the ten write gaps are write gaps in which an opening portion is formed as a through hole in the magnetic film by FIB processing. The cross-sectional sample produced as above was observed by SEM, and the cross-sectional shape of the through hole of each write gap formed by FIB processing was an inverted taper shape in which the opening width narrows from the recording surface side to the back surface side.

In the heads A to O, the ten write gaps have an opening portion formed by FIB processing at a gap end portion of the write gap on the recording surface side. The opening portion is a through hole extending to the back surface side. The cross-sectional sample produced as above was observed by SEM, and the cross-sectional shape of the through hole of each write gap formed by FIB processing was an inverted taper shape in which the opening width narrows from the recording surface side to the back surface side. However, since the non-magnetic material portion is provided, the recording surface-side gap width is narrower than the back surface-side gap width in any of the ten write gaps. As shown in Table 1, it was possible for the heads A to O to make saturated recording on the magnetic tape having coercivity equal to or larger than coercivity by which the saturated recording was not possible in the head P (Comparative Test Example 1).

In addition, in the results shown in Table 1, a head capable of making saturated recording even on a magnetic tape having higher vertical coercivity has higher recording ability.

In the heads A to P, the vicinity of the opening portion formed by FIB processing in the surface of the magnetic film on the recording surface side was observed by an optical microscope, and a portion (so-called burnt-out site) altered by ion irradiation in a case where image pick-up was performed by a scanning ion microscope (SIM) to specify a processing target region for FIB processing was confirmed.

An aspect of the present invention is useful in the technical field of magnetic recording for performing high-density recording.

What is claimed is:

1. A magnetic recording head comprising:
   a magnetic film including a write gap,
   wherein in the write gap, a recording surface-side gap width is narrower than a back surface-side gap width,
   the write gap has an opening portion at a gap end portion on a recording surface side,
   the recording surface-side gap width of the write gap is 1.5 μm or less,
   the back surface-side gap width of the write gap is 20.0 μm or less,
   a thickness of the magnetic film is 1.0 μm or more,
   the write gap includes a non-magnetic material portion at a gap end portion on a back surface side, and
   a thickness of the non-magnetic material portion is 5% or more and 90% or less with respect to the thickness of the magnetic film.

2. The magnetic recording head according to claim 1, wherein the magnetic recording head is a servo write head.

3. The magnetic recording head according to claim 1, wherein the recording surface-side gap width of the write gap is 0.2 μm or more and 1.5 μm or less.

4. The magnetic recording head according to claim 1, wherein the back surface-side gap width of the write gap is 2.0 μm or more and 20.0 μm or less.

5. The magnetic recording head according to claim 1, wherein a thickness of the magnetic film is 1.0 μm or more and 10.0 μm or less.

6. The magnetic recording head according to claim 1, wherein a non-magnetic material constituting the non-magnetic material portion is a silicon oxide.

7. The magnetic recording head according to claim 1, wherein the magnetic film is an iron nitride-based alloy film.

8. A magnetic recording apparatus comprising:
   the magnetic recording head according to claim 1.

9. The magnetic recording apparatus according to claim 8, wherein the magnetic recording apparatus is a servo writer.

10. A manufacturing method of the magnetic recording head according to claim 1, comprising:
    forming a non-magnetic material portion on a substrate;
    forming a magnetic film to cover the non-magnetic material portion on the substrate; and
    forming an opening portion by ion beam processing in a portion of the magnetic film in which a write gap is required to be formed,
    wherein the portion to be subjected to ion beam processing has the non-magnetic material portion between the magnetic film and the substrate.

11. The manufacturing method of a magnetic recording head according to claim 10,
    wherein the ion beam processing is focused ion beam processing.

12. A manufacturing method of a magnetic recording medium having a servo pattern, comprising:
    forming a servo pattern on the magnetic recording medium by the magnetic recording head according to claim 1.

13. The manufacturing method of a magnetic recording medium according to claim 12,
    wherein the servo pattern is a timing-based servo pattern.

14. The manufacturing method of a magnetic recording medium according to claim 12,
    wherein vertical coercivity of the magnetic recording medium is 2,800 Oe or more.

15. The manufacturing method of a magnetic recording medium according to claim 13,
    wherein vertical coercivity of the magnetic recording medium is 2,800 Oe or more.

16. The magnetic recording head according to claim 1,
    wherein the recording surface-side gap width of the write gap is 0.2 μm or more and 1.5 μm or less,
    the back surface-side gap width of the write gap is 2.0 μm or more and 20.0 μm or less, and
    a thickness of the magnetic film is 1.0 μm or more and 10.0 μm or less.

* * * * *